United States Patent Office 2,757,454
Patented Aug. 7, 1956

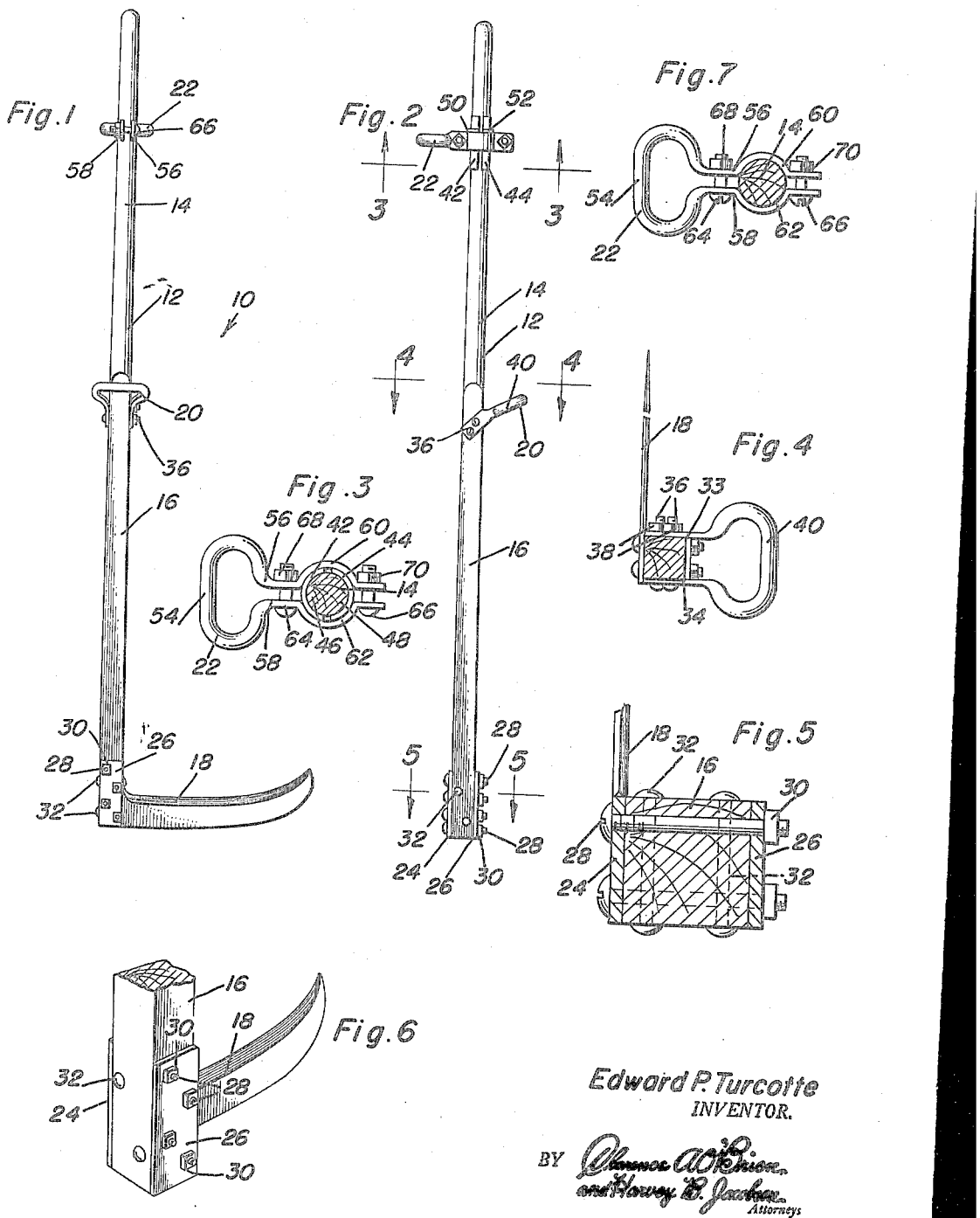

2,757,454
BRUSH CUTTING KNIFE
Edward P. Turcotte, Hartford, Conn.
Application June 22, 1954, Serial No. 438,408
2 Claims. (Cl. 30—309)

This invention relates to an agricultural implement, and more particularly to a novel garden tool.

The primary object of the present invention resides in the provision of a garden tool which is adapted to be utilized in the cutting of brush, bushes, vegetables, vines, grass, weeds or the like, and to be otherwise adapted for use in the garden while being capable of being used as a lever for lifting plants and for other useful purposes.

The construction of this invention features a knife which has a blade detachably secured thereto so that other blades of various sizes may be substituted readily and which has one handle angularly attached thereto in a fixed relationship while having another handle longitudinally and rotatably adjustably mounted on the shaft of the tool.

One of the features of the invention resides in the arrangement of parts for suitably securing the adjustable handle in a selected position so that there will be little wobbling or twisting of the handle once in its secured position.

Still further objects and features of this invention reside in the provision of a garden tool that is strong and durable, capable of being used in a manner so as to prevent the edge thereof from becoming dulled due to the scythe-like arrangement of parts, and which includes handles having substantially U-shaped portions forming hand holds which are relatively rigid, thereby enabling the user of the tool to employ the tool with a minimum of accidental injury to himself.

These, together with the various ancillary objects and features of the invention which will become apparent as the following description proceeds, are attained by this garden implement, preferred embodiments of which have been illustrated in the accompanying drawings, by way of example only, wherein:

Figure 1 is an elevational view of the garden tool comprising the present invention;

Figure 2 is another elevational view, looking at the invention in a plane normal to the view illustrated in Figure 1;

Figure 3 is a sectional detail view as taken along the plane of line 3—3 in Figure 2 and being drawn in an enlarged scale for greater clarity;

Figure 4 is an enlarged sectional view as taken along the plane of line 4—4 in Figure 2 illustrating the construction of the rigidly mounted handle;

Figure 5 is an enlarged sectional view as taken along the plane of line 5—5 in Figure 2, illustrating the manner in which the blade is secured to the shaft;

Figure 6 is a partial perspective view of the garden tool illustrating the construction of the blade and its manner of attachment to the shaft; and Figure 7 is a sectional view similar to that of Figure 3, illustrating a form of the invention eliminating the wear or guide plates.

The tool comprising the present invention is adapted to be constructed for use, as may be necessary, by persons who are right handed or left handed, and is especially adaptable for use in clearing land of bushes and undergrowth, as along railroad and power line rights-of-way.

With continuing reference to the accompanying drawings wherein like reference numerals designate similar parts throughout the various views, reference numeral 10 generally designates the garden implement comprising the present invention. This garden implement 10 includes a shaft 12 having a portion 14 of substantially circular cross-section and having a portion 16 substantially rectangular in cross-sectional shape. The utilization of a composite shaft having portion 14 of circular cross-section and portion 16 of rectangular cross-section is highly desirable since it permits the blade 18 and the handle 20 to be rigidly secured in a convenient manner to the shaft 12 while the handle 22 is adjustably mounted on the shaft 12.

The blade 18 has a substantially rectangular attaching plate 24 integrally formed therewith and an opposed plate 26 is positioned on the opposite side of the substantially rectangular portion 16. Apertures are drilled in the plates 24 and 26 as well as in the shaft portion 16, and bolts, as at 28, together with nuts 30 thereon are utilized to detachably secure the blade 18 to the shaft portion 16. The plates 24 and 26 prevent excessive wear on the shaft portion 16 by attachment and detachment of the blade 18 from the shaft portion 16 and further protect the end of the tool from damage during use. Reinforcing rivets 32 extend perpendicularly to the bolts 28 to tie the shaft portion 16 against splitting and thus render the entire blade connection strong and durable.

At the inner end of the rectangular shaft portion 14, the handle 20 is secured. The handle 20 includes a pair of attaching flanges 33 and 34 which extend angularly with respect to the handle 20 and with respect to the axis of the shaft 12. The flanges 33 and 34 have apertures drilled therethrough which align with apertures in the shaft portion 16 so that bolts 36 can be utilized to secure the handle 20 to the shaft portion 16. Nuts 38 lockingly hold the handle 20 in position. Preferably integrally formed with the attaching flanges 33 and 34 is a substantially U-shaped portion 40 which extends angularly outwardly from the shaft 12 and towards the circular shaft portion 14. The U-shaped portion 40 thereby forms a convenient and readily accessible hand hold for a user of the tool 10.

As is shown in Figures 2 and 3, there is secured to the shaft portion 14 a pair of plates 42 and 44 which are arcuate in configuration and which are held in position by suitable screws, as at 46 and 48. These plates 42 and 44 each have beads, as at 50 and 52, thereon against which the handle 22 abuts. The handle 22 includes a U-shaped portion 54 having a pair of spaced clamping plates 56 and 58 integrally formed therewith. The clamping plates 56 and 58 are positioned in embracing relationship about the wear or guide plates 42 and 44 and about the shaft portion 14 and bolts 64 and 66 are utilized in conjunction with nuts 68 and 70 to clampingly hold the handle 22 on the shaft 12 in abutting relationship with the beads 50 and 52.

In use, after loosening the bolts 64, the handle 22 may be rotated and slid to a comfortable position. The plates 42 and 44 are positioned so that the beads 50 and 52 will hold the handle 22 in the position most comfortable for the utilizer of this tool. However, in cases where the tool may be utilized by several persons, the plates 42 and 44 can be eliminated, and the arrangement as is shown in Figure 7 can be utilized, wherein the clamping plates 56 and 58 are directly secured on the circular cross-sectional portion 14 of the shaft 12. Then, as may be desired, the handle 22 can be longitudinally adjusted with respect to the shaft 12, as may be required. Utilization of the circular cross-sectional portion 14 is highly desirable, since the circular shape thereof permits ready rotation of the handle 22 when the bolts 64 and 66 are loosened.

In operation, after the handle 22 has been positioned to suit the user, the tool is utilized to cut various types of vegetation and to also trim, cut, heel or otherwise cultivate bushes, vegetables and the like.

From the foregoing, the construction and operation of the device will be readily understood and further description is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A garden implement comprising an elongated shaft having a portion thereof including an end of substantially rectangular cross-section and having another portion thereof substantially circular in cross-section, a blade attached to the end of said portion of rectangular cross-section, a first handle having spaced attaching flanges, said flanges being secured to said shaft on either side of said portion of rectangular cross-section, and a second handle rotatably, slidably adjustably secured on said portion of substantially circular cross-section, said blade having an integrally formed attaching plate, an opposed plate on the opposite side of said shaft from said blade, and fasteners extending through said attaching plate, said shaft, and said opposed plate detachably securing said blade to said shaft, said first handle being of substantially U-shape to form a hand hold and extending angularly outwardly from said shaft and towards said portion of substantially circular cross-section, said second handle having a pair of spaced opposed clamping plates, each of said clamping plates having opposed concavities for reception of said shaft, fasteners extending between said clamping plates on each side of said concavities and said shaft, said second handle having a substantially U-shaped portion attached to said clamping plates, guide plates extending parallel to said shaft secured to said shaft, a bead on said guide plates, said second handle encompassing said guide plates and engaging said bead.

2. A garden implement comprising an elongated shaft having a portion thereof including an end of substantially rectangular cross-section and having another portion thereof substantially circular in cross-section, said portion of rectangular cross-section extending substantially one-half the length of said shaft, a blade attached to the end of said portion of rectangular cross-section, a first handle having a U-shaped hand hold and having spaced attaching flanges, said flanges being secured to said shaft on either side of said portion of rectangular cross-section, and a second handle having a U-shaped hand hold, said second handle being rotatably, slidably adjustably secured on said portion of substantially circular cross-section, said second handle having a pair of spaced opposed clamping plates, each of said clamping plates having opposed concavities for reception of said shaft, fasteners extending between said clamping plates on each side of said concavities and said shaft, said second handle having a substantially U-shaped portion attached to said clamping plates, guide plates extending parallel to said shaft secured to said shaft, a bead on said guide plates, said second handle encompassing said guide plates and engaging said bead.

References Cited in the file of this patent

UNITED STATES PATENTS

| 715,056 | Gruner | Dec. 2, 1902 |
| 745,798 | Czermak | Dec. 1, 1903 |
| 747,206 | Morgan | Dec. 15, 1903 |
| 1,568,111 | Vidos | Jan. 5, 1926 |

FOREIGN PATENTS

| 578,130 | Great Britain | June 17, 1946 |